United States Patent
Hadziristic et al.

(10) Patent No.: US 10,476,408 B1
(45) Date of Patent: Nov. 12, 2019

(54) METHOD OF CONTROLLING PROPULSION AND SUSPENSION OF LINEAR INDUCTION MOTORS

(71) Applicants: Konstantin Hadziristic, Toronto (CA); Vladimir Viktorovich Kuptsov, Magnitogorsk (RU)

(72) Inventors: Konstantin Hadziristic, Toronto (CA); Vladimir Viktorovich Kuptsov, Magnitogorsk (RU)

(*) Notice: Subject to any disclaimer, the term of this patent is extended or adjusted under 35 U.S.C. 154(b) by 0 days.

(21) Appl. No.: 16/394,700

(22) Filed: Apr. 25, 2019

(51) Int. Cl.
| | |
|---|---|
| *H02P 5/00* | (2016.01) |
| *H02K 41/00* | (2006.01) |
| *H02N 15/02* | (2006.01) |
| *H02P 3/18* | (2006.01) |
| *H02P 25/062* | (2016.01) |
| *H02P 5/74* | (2006.01) |
| *B60L 13/06* | (2006.01) |

(52) U.S. Cl.
CPC .............. *H02N 15/02* (2013.01); *H02P 3/18* (2013.01); *H02P 5/74* (2013.01); *H02P 25/062* (2016.02); *B60L 13/06* (2013.01)

(58) Field of Classification Search
CPC ......... H02N 15/02; H02P 25/062; H02P 3/18; H02P 5/74; B60L 13/06
USPC .......................................................... 318/38
See application file for complete search history.

(56) References Cited

U.S. PATENT DOCUMENTS

| | | | |
|---|---|---|---|
| 7,895,951 B1* | 3/2011 | McGrath, Jr. ........... | B60L 5/005 104/292 |
| 8,091,483 B1* | 1/2012 | Sumner ................... | A63G 3/00 104/59 |
| 9,511,959 B2 | 12/2016 | Bambrogan et al. | |
| 9,517,901 B2 | 12/2016 | Bambrogan et al. | |
| 9,604,798 B2 | 3/2017 | Bambrogan et al. | |
| 9,718,630 B2 | 8/2017 | Bambrogan et al. | |
| 10,093,493 B2 | 10/2018 | Bambrogan et al. | |
| 10,370,006 B2* | 8/2019 | Duran Ariza | |
| 2008/0272716 A1* | 11/2008 | Yu ........................... | H02P 23/08 318/135 |
| 2009/0114114 A1* | 5/2009 | Rose ....................... | A63G 7/00 104/53 |
| 2016/0038840 A1* | 2/2016 | Vance .................... | A63G 21/04 104/53 |

FOREIGN PATENT DOCUMENTS

EP    PCT/JP91/00831    12/1991

OTHER PUBLICATIONS

Cox, Tom, et al. (2016). "Vehicular Suspension and Propulsion Using Double Sided Linear Induction Machines." IEEE Energy Conversion Congress and Exposition (ECCE).
Frien, Paul, (2004). "Magnetic Levitation Train Technology 1." Bradley University Department of Electrical and Computer Engineering.

(Continued)

*Primary Examiner* — Bickey Dhakal
*Assistant Examiner* — Gabriel Agared

(57) ABSTRACT

The invention relates to a method of controlling simultaneously and independently both propulsion and levitation of one or a group of linear induction motors (LIMs). The method consists of a combination of two sub-methods: a current balancing sub-method and a regenerative levitation sub-method.

3 Claims, 3 Drawing Sheets

(56) References Cited

OTHER PUBLICATIONS

He, J.L., et al. (1992). "Survey of foreign MAGLEV systems" Transport Research International Documentation—TRID, Jul. 1992.
Hikasa, Yoshio, and Yutaka, Takeuchi (1980). "Detail and experimental results of ferromagnetic levitation system of Japan air lines HSST-01/-02 vehicles." IEEE Transactions on Vehicular Technology 29:1.
Ji, Woo-Young, et al. (2018). "A Study of Non-Symmetric Double-Sided Linear Induction Motor for Hyperloop All-In-One System (Propulsion, Levitation, and Guidance)." IEEE Transactions on Magnetics 54:11.
Kinjiro, Yoshida, et al. (2000). "Decoupled-Control Method of Normal and Thrust Forces in SLIM MAGLEV Vehicle ME01." Faculty of Information Science and Electrical Engineering, Kyushu University, pp. 37-42.
Morizane, Toshimitsu, et al. (2011). "Control of Traction and Levitation of Linear Induction Motor Driven by Power Source With Frequency Component Synchronous With the Motor Speed." IEEE Transactions on Magnetics 47:10.
Verdel, Anton J.D. (2007). "Decoupled Control of Thrust and Normal Forces of Linear Induction Motor for a Novel Magnetically Levitated System." Eindhoven University of Technology and Philips Applied Technologies.

* cited by examiner

METHOD OF CONTROLLING PROPULSION AND SUSPENSION OF LINEAR INDUCTION MOTORS

THE FIELD OF INVENTION

Illustrative embodiments of the disclosure generally relate to linear induction motor control. More particularly, this invention relates to a distinctive method of controlling the propulsion and suspension of one or a plurality of linear induction motors which are mechanically interconnected through the same secondary. The disclosure is further directed, by way of non-limiting example, to transportation systems comprising such motors.

Under the Cooperative and International Patent Classification this invention belongs to H02K 41/00 group and the application of the invention belongs to B61B 13/00 group.

BACKGROUND OF THE INVENTION

Linear induction motors are the preferred choice in transportation systems due their simplicity, price, and reliability. They are utilized as means of propulsion and in some cases as suspension, as well as guidance.

These are usually two physically separate systems built and controlled independently. One set of linear motors produces propulsion forces while the totally independent system generates magnetic levitation (suspension) forces, recognized as MAGLEV. The known MAGLEV systems are typically based on magnetic attraction between two ferromagnetic parts. However, some MAGLEV systems are based on magnetic repulsion and they are typically air-cored.

The TransRapid railing system has been developed in Germany, which utilizes electromagnetic suspension based on attraction between on-board electromagnets and iron-backed guideway rails. The system is expensive, not very efficient, and not stable at very high speeds (He et al., 1992).

The MLX railing system, developed in Japan, utilizes electrodynamic suspension (EDS) to levitate the train. In this railing system, magnets on the train induce currents in the guiding rails. These currents create magnetic fields which interact with the original field of the magnets. Levitation is supported by the repulsive force between the two fields. The magnets on the train are either electromagnets or an array of permanent magnets. The advantage of EDS systems is that they are naturally stable at high speeds and thus no feedback control is needed, unlike the TransRapid System. However, EDS systems have disadvantages: they are very expensive and the train must be equipped with wheels because at slow speeds the induced currents are not strong enough to support levitation (Hikasa and Takeuchi, 1980).

The Inductrack method, developed in the United States, utilizes passive levitation. No external power is needed to levitate the train. The levitation is produced by the motion of on-board permanent magnets over the rail so that induced eddy currents obtain the repulsion force (Friend, 2004).

Hyperloop Transportation Technologies and Hyperloop One utilize very similar suspension methods as the Inductrack. The levitation is produced by the motion of an on-board Halbach array of permanent magnets over the conductive rail. Among others, the system has one major disadvantage: the passive suspension typically is not controllable (Bambrogan at al., 2017, and other Hyperloop One patents).

Many attempts have been made to combine these two functions (propulsion and suspension) in one system, but based on practical linear induction motors. It is known that linear induction motors can produce normal forces (lift) together with thrust, but the problem is producing a successful control method of a combined propulsion-suspension drive system.

A few attempts have been made to create such a control system:

Morizone at al. propose the novel control method of the thrust force and the attractive force of LIM driven by the power source with the frequency component synchronous with the motor speed. In this control method, it is possible to apply the conventional vector control to the thrust force control of LIM. The frequency component synchronous with the motor speed does not generate the thrust force. Therefore the frequency component synchronous with the motor speed is able to adjust the attractive force for levitation without influence on thrust force control (Morizane et al, 2011).

Verdel's paper presents a feasibility study of a novel magnetic levitation system through the use of linear induction motor (LIM) segments implemented in a rotating ring system.

It investigates the best manner of simultaneous and decoupled control of thrust and normal forces generated by the single-sided LIM (SLIM) (Verdel, 2007).

In 2018, Korean scientists proposed an all-in-one system for a hyperloop that conducts propulsion, levitation, and guidance. It is based on a non-symmetric double-sided linear induction motor (Ji et al, 2018).

Cox et al present a new method of combined electromagnetic levitation and propulsion using a double-sided linear induction machine and a simple conductive sheet secondary. If the supply phase angle of one primary is modified with respect to that of the other, a controllable lift force can be developed on the conductive secondary and its load at any velocity or when stationary (Cox et al, 2016).

Japanese scientists propose a decoupled-control method of normal and thrust forces in single-sided linear induction motor (SLIM) which is based on a unified concept of machine principle. This method is derived from the analytical formulas for normal and thrust forces of a SLIM. This method can be applied to a LIM vehicle system, in which the normal force is used to levitate and the thrust force to propel a LIM vehicle without force-couple of LIM. By using this method, a compact combined levitation-and-propulsion system with LIM only can be realized. This method is verified by a successful simulation of levitation and propulsion for a SLIM model vehicle (Kinjiro et al, 2000, and Kinjiro, 1991).

The objective of this invention is to resolve the problem of controlling a system of linear induction motors, which can be grouped so as to produce both propulsion and levitation simultaneously but which are both independently controllable.

SUMMARY OF THE INVENTION

This invention discloses a control method of one or a group of linear induction motors (LIMs) wherein both horizontal and normal force components for propulsion and levitation are regulated simultaneously and independently.

This method consists of a combination of two sub-methods: a current balancing sub-method and a regenerative levitation sub-method.

The current balancing sub-method consists of de-coupled control of current fed to the upper and lower primaries of one DSLIM, or the upper and lower primaries of a plurality of DSLIMs.

The regenerative levitation sub-method involves two or more double-sided linear induction motors (DSLIM), two or more single-sided linear induction motors (SLIM), or two or more tubular linear induction motors (TLIM), mounted side by side on the same movable chassis, while they share the same stationary secondary rail, or mounted side by side on the same stationary chassis, while they share the same movable secondary rail, and separately fed from power controllers so that at least one can work in generator mode and balance thrust and lift forces of the first LIM, or other LIMs, in motoring mode.

DETAILED DESCRIPTION

Figure 1:
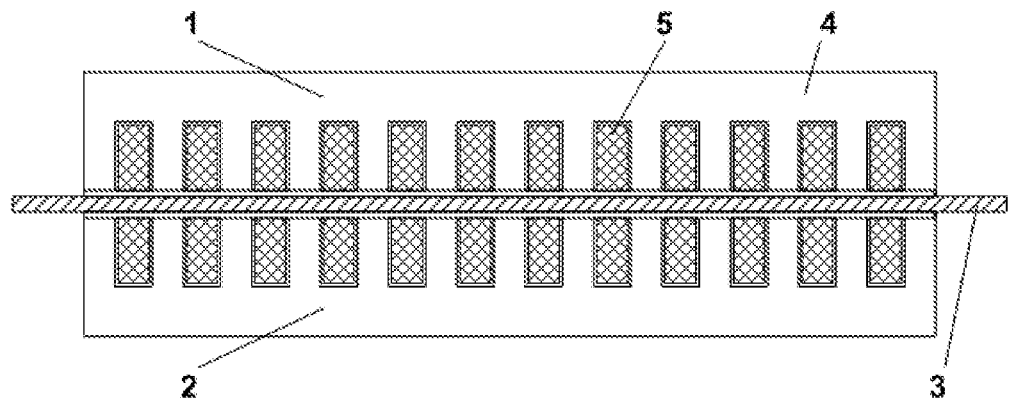
FIG. 1 presents a cross-sectional view of a DSLIM.

FIG. 1 presents a cross-sectional view of a horizontal double-sided linear induction motor (DSLIM) which will be utilized to illustrate the first sub-method of controlling propulsion and suspension of one or a group of double-sided linear induction motors. Principles of operation and design of a DSLIM are well known in prior art. DSLIM consists of an upper primary 1, a lower primary 2 and a non-ferromagnetic secondary 3. Each primary contains ferromagnetic circuit 4 and multiple electrical coils 5 distributed in its slots. The sub-method can be applied to one DSLIM, or the group of DSLIMs, where a DSLIM topology consists of stationary secondary and movable primary or primaries, or wherein a DSLIM topology consists of movable secondary and stationary primary or primaries.

The power supply of the DSLIM is constructed so that it provides independent control of the currents fed to the upper and lower primaries of the DSLIM. The thrust force is controlled directly by the sum of upper and lower primary currents while the required lifting force can be adjusted by the difference of currents in the upper and the lower primary of the DSLIM.

If only the upper primary of the DSLIM is fed by a current to produce the desired thrust force, it will simultaneously generate significant normal force in the direction of the Y-axis. If the current is also injected into the lower primary of the DSLIM, it creates normal force in the opposite direction. This can be used to control the resulting lifting force of the DSLIM by rebalancing the currents in the upper and lower primaries. The resulting total thrust force of the DSLIM depends on the sum of upper and lower currents and the slip frequency. The main advantage of this method is that the thrust force can be controlled independently of the lifting force.

The general expressions for resulting thrust and lifting forces of the DSLIM shown in FIG. 1 can be written as follows:

$$F_{th}=F_{th\_upper}+F_{th\_lower} \quad (1)$$

$$F_{lift}=F_{lift\_upper}-F_{lift\_lower}, \quad (2)$$

where $F_{th\_upper}$ and $F_{lift\_upper}$ are thrust and lifting forces of the upper primary of the DSLIM, $F_{th\_lower}$ and $F_{lift\_lower}$ are thrust and lifting forces of the lower primary of the DSLIM. The upper and lower primaries of the DSLIM are fed by the current with the same frequency and phase angle. Assuming that the DSLIM operates with slip at which the maximum efficiency is reached when $F_{th\_upper}$ and $F_{lift\_upper}$ become functions of the upper primary current amplitude $I_{upper}$ and $F_{th\_lower}$ and $F_{lift\_lower}$ become functions of the lower primary current amplitude $I_{lower}$. Taking this into account and according to (1) and (2) the resulting thrust and lifting forces can be controlled independently of each other by adjusting $I_{upper}$ and $I_{lower}$ current amplitudes.

This sub-method is more efficient when the high thrust force is generated. In that case the intensity of the current in the upper primary is enough to create the required lifting force. In a case when low or zero thrust force is needed, the current value in the upper primary of DSLIM is not high enough to produce the required lifting force to levitate the vehicle. To improve the approach described above, it can be combined with the regenerative levitation sub-method. The precondition for this second sub-method is the application of two or more DSLIM mechanically coupled and electrically interconnected through their separate power controllers.

Figure 2:
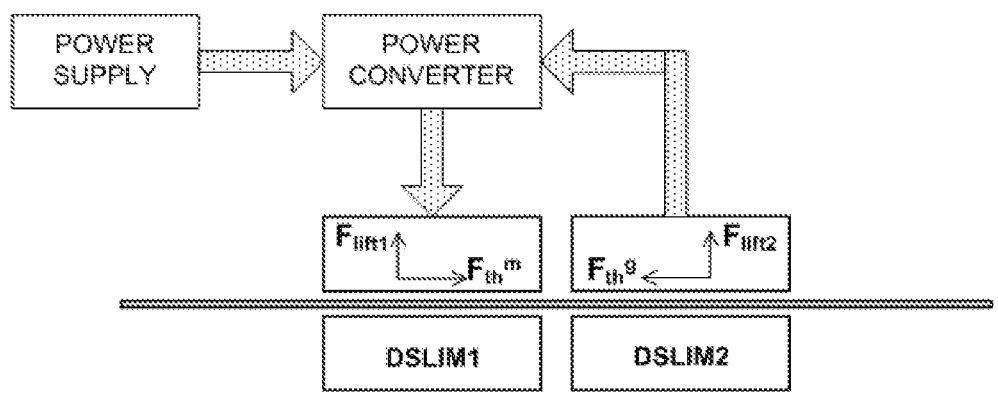
FIG. 2 presents a block diagram of regenerative levitation sub-method with two DSLIMs.

Drawing FIG. 2 illustrates the cross-section of two horizontal double-sided linear induction motors (DSLIMs), the same as shown in FIG. 1, whose upper and lower primaries are mounted side by side on the same movable chassis, while they share the same stationary conductive flat secondary. The first DSLIM (DSLIM1) operates in motoring mode and produces the thrust force $F_{th}^m$. The second DSLIM (DSLIM2) operates in generating mode and produces drag force $F_{th}^g$ in the opposite direction to the thrust force of the first DSLIM. The resulting thrust force of the system will be $$F_{th}=F_{th}^m-F_{th}^g \quad (3)$$

There will be current flowing in upper parts of both DSLIMs, each of them producing lifting force. The resulting lifting force will be $$F_{lift}=F_{lift1}+F_{lift2}, \quad (4)$$

where $F_{lift1}$ is lifting force of the first DSLIM and $F_{lift2}$ is lifting force of the second DSLIM. The second DSLIM operating in generator mode creates an additional load for the first DSLIM, which results in the increase of its current to produce the required lifting force. Energy generated by the second DSLIM is used to feed back the first DSLIM. Provided that the efficiency of both DSLIMs is high enough, the proposed method of regenerative levitation can be much more efficient than methods using permanent magnets or zero slip frequency current injection. Furthermore, it is possible that each DSLIM operates with an optimal slip value at which the maximum efficiency is achieved.

The resulting lifting force of the system defined by equation (3) can be controlled independently of the resulting thrust force defined by equation (4). When each DSLIM operates with the slip at which the maximum efficiency is observed then $F_{th}^m$, $F_{th}^g$, $F_{lift1}$ and $F_{lift2}$ of (3) and (4) become functions of the current (in some cases there is only current flowing in the upper primary of each DSLIM). When the control algorithm directs some current $I_1$ to the first DSLIM, it produces some values of $F_{th}^m$ and $F_{lift1}$. Then the current $I_2$ of the second DSLIM is adjusted so that the resulting lifting force of (4) is equal to the desired value. After that, the current $I_1$ of the first DSLIM is adjusted depending on the resulting thrust force of the system defined by (3): if the resulting thrust force is less than the desired value, $I_1$ is increased, otherwise $I_1$ should be decreased. Then $I_2$ is adjusted again to obtain the desired lifting force and this process is repeated until both thrust and lifting force reach the desired values.

Figure 3:
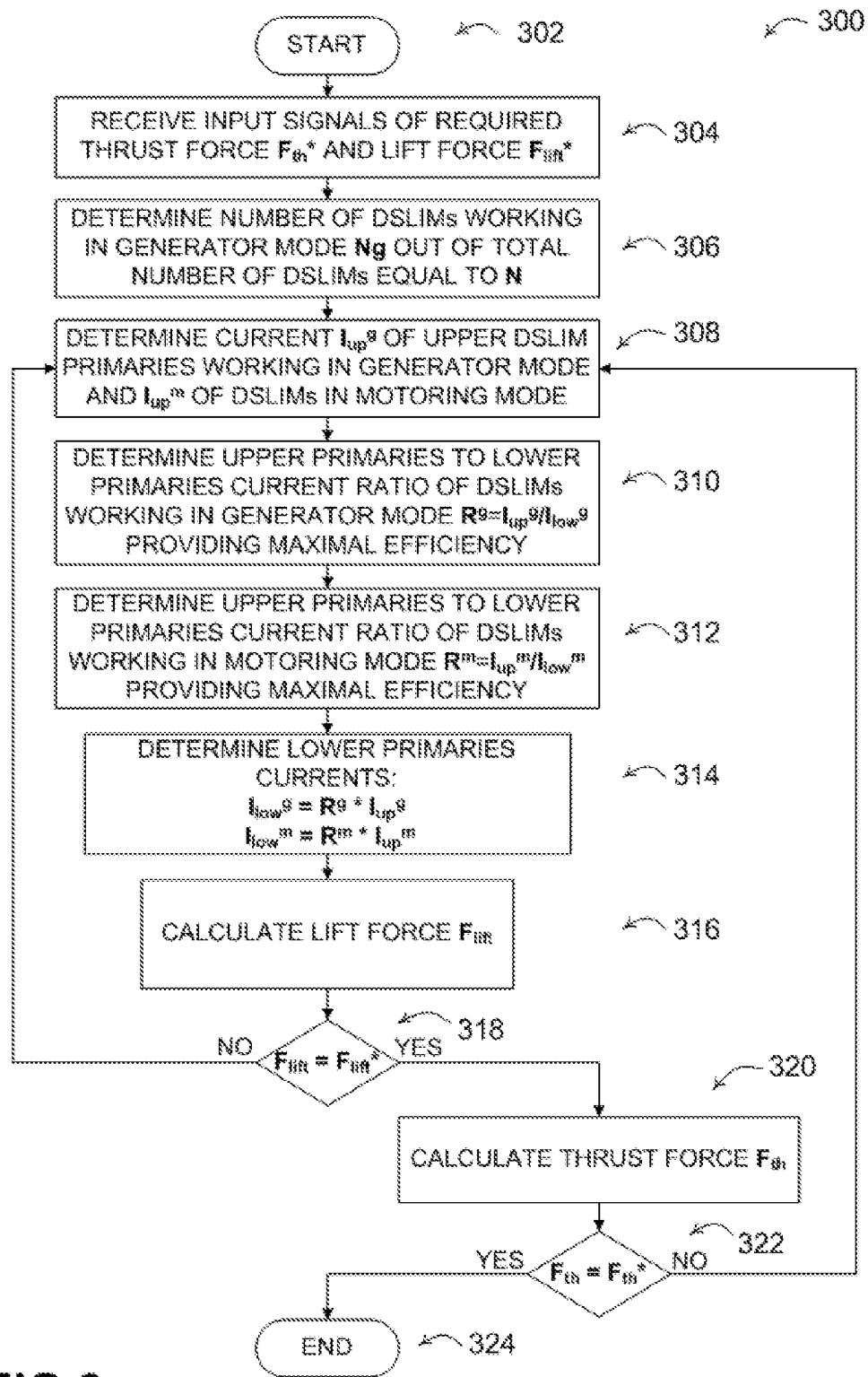
FIG. 3 presents the flowchart of the disclosed method.

The flowchart of the control algorithm is shown in FIG. 3. The overall control methodology consists of two sub-methods: the upper and lower current balancing sub-method and the regenerative levitation sub-method used in different operating conditions.

The flowchart (block diagram) 300 on FIG. 3 illustrates an embodiment of a method of controlling the propulsion and suspension of one or a plurality (a group) of linear induction motors. The method 300 may begin at block 302. First, the input signals for required thrust force $F_{th}^*$ and lift force $F_{lift}^*$ are received in the block 304. A determination may be made in the block 306 as to what number Ng of DSLIMs needs to work in generator mode out of total number N of DSLIMs in the group. Then, based on given requirements and conditions, the needed current of the upper primaries of the group of DSLIMs working in motoring mode $I_{up}^m$ and upper primaries working in generator mode $I_{up}^g$, necessary to deliver desired thrust force ($F_{th}^*$) and lift force ($F_{lift}^*$), may be calculated in block 308. The ratio of the current in upper primaries versus the current in lower primaries $R_g$, which will provide maximal efficiency of the group of DSLIMs working in generator mode, may be determined in block 310. The ratio of the current in upper primaries versus the current in lower primaries $R_m$, which will provide maximal efficiency of the group of DSLIMs working in motoring mode, may be determined in block 312. Then the needed current of the lower primaries of the group of DSLIMs working in motoring mode $I_{low}^m$ and lower primaries working in generator mode $I_{low}^g$, needed to produce desired thrust force ($F_{th}^*$) and lift force ($F_{lift}^*$), may be calculated in block 314. Finally, the resulting calculated lift force $F_{lift}$ may be determined in block 316. A determination may be made in block 318 as to weather the resulting lift force $F_{lift}$ is equal to the requested lift force $F_{lift}^*$. If the calculated lift force $F_{lift}$ is equal to the requested lift force $F_{lift}^*$ may be initiated the block 320 where resulting thrust force $F_{th}$ may be calculated. If not, then the calculation of currents in the upper primaries of the group of DSLIMs working in motoring mode $I_{up}^m$ and upper primaries working in generator mode $I_{up}^g$, need to be repeated in block 308 and all consequent steps to block 318 repeated.

After the resulting thrust force $F_{th}$ is calculated in block 320 a determination may be made in block 322 as to whether the resulting thrust force $F_{th}$ is equal to the requested thrust force $F_{th}^*$. If the resulting thrust force $F_{th}$ is equal to the requested thrust force $F_{th}^*$, the method may end at block 324. If not, then the currents in the upper primaries of the group of DSLIMs working in motoring mode $I_{up}^m$ and upper primaries working in generator mode $I^{ng}$ need to be recalculated in block 308 and all consequent steps to block 322 repeated.

In the different embodiment, only the current balancing sub-method is utilized to control the propulsion and levitation forces by regulating the currents fed to upper and lower primaries of one DSLIM, or upper and lower primaries of a plurality of DSLIMs. The illustrative flowchart of this embodiment is the same flowchart of the control algorithm shown in FIG. 3 with the assumption that the number of DSLIMs in generator mode $N_g$ is equal to zero in propulsion mode and the number of DSLIM in generator mode $N_g$ is equal to N in braking mode.

Figure 4:
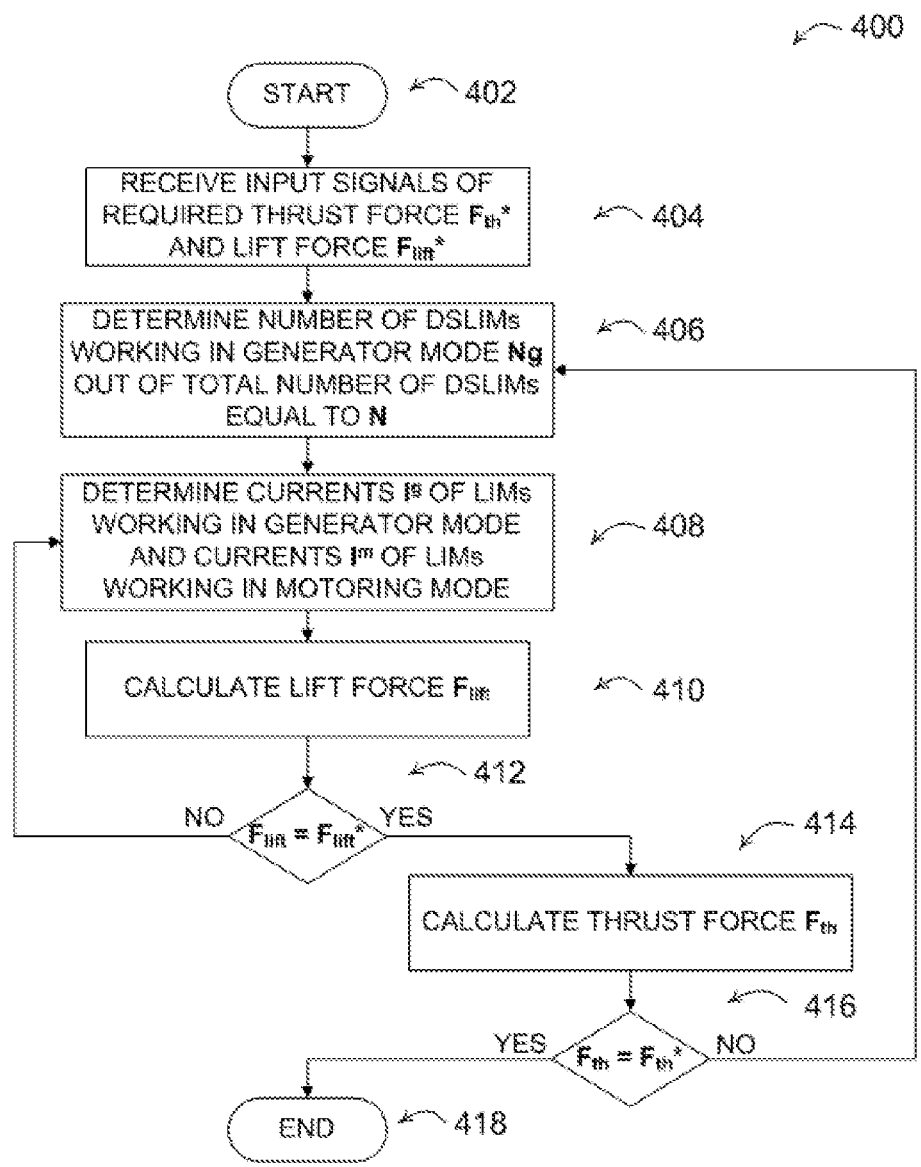
FIG. 4 presents the flowchart of the disclosed regenerative levitation sub-method.

In the other embodiment, only the regenerative levitation sub-method is utilized to control propulsion and levitation of two or more double-sided linear induction motors (DSLIM), two or more single-sided linear induction motors (SLIM), or two or more tubular linear induction motors (TLIM). FIG. 4 presents the flowchart 400 of the disclosed regenerative levitation sub-method. The method 400 may begin at block 402. First, the input signals for required thrust force $F_{th}^*$ and lift force $F_{lift}^*$ are received in the block 404. A determination may be made in the block 406 as to what number Ng of LIMs needs to work in generator mode out of total number N of LIMs in the group. Then, based on given requirements and conditions, the necessary current of the group of LIMs working in motoring mode $I_m$ and necessary current of the group of LIMs working in generator mode $I_g$, necessary to deliver desired thrust force ($F_{th}^*$) and lift force may be calculated in block 408. Finally, the resulting calculated lift force $F_{lift}$ may be determined in block 410. A determination may be made in block 412 as to whether the resulting lift force $F_{lift}$ is equal to the requested lift force $F_{lift}^*$. If the calculated lift force $F_{lift}$ is equal to the requested lift force $F_{lift}^*$ may be initiated in the block 414 where resulting thrust force $F_{th}$ may be calculated. If not, then the calculation the current of the group of LIMs working in motoring mode $I^m$ and the current of the group of LIMs working in generator mode $I^g$, need to be repeated in block 408 and all consequent steps to block 412 repeated. After the resulting thrust force $F_{th}$ was calculated in block 414 a determination may be made in block 416 as to weather the resulting thrust force $F_{th}$ is equal to the requested thrust force $F_{th}^*$. If not, then new determination may be made in the block 406 as to what number Ng of LIMs needs to work in generator mode out of total number N of LIMs in the group and all consequent steps to block 416 repeated. If the resulting thrust force $F_{th}$ is equal to the requested thrust force $F_{th}^*$ the method may end at block 324.

The invention may be applied in passenger or industrial transportation systems.

One possible application is in control of propulsion and suspension of a vehicle equipped with two or more motor/generator groups of DSLIM, SLIM, or TLIM with a stationary secondary and movable primaries.

Another possible application is in control of propulsion and suspension of a vehicle equipped with two or more motor/generator groups of DSLIM, SLIM, or TLIM with a stationary primaries and movable secondary.

In some applications in transportation, retractable wheels may be utilized for emergency stops and for stationary stop and start-up speeds of a vehicle, while in the acceleration and cruising speed regimes, the vehicle may be propelled and levitated electromagnetically by this invention.

The exclusive property or privilege of the invention is claimed and defined as follows:

1. A method of controlling propulsion and suspension of a group of two or more double-sided linear induction motors (DSLIM), comprising the steps of:
   a. receiving by a controller a first input signal request for a thrust force to be generated by the group of DSLIMs;
   b. receiving by the controller a second input signal request for a lift force to be generated by the group of DSLIMs;
   c. when a propulsion regime is applied, converting at least one DSLIM in the group to a generator mode while other DSLIMs in the group operate in motoring mode and balancing current amplitudes in upper and lower primaries of each DSLIM in the group causing that the said group of DSLIMs provides a required positive thrust force produced by a sum of upper and lower currents of all DSLIMs of the group and the said group of DSLIMs provides a required lift force produced by a difference of upper and lower currents of all DSLIMs of the group; and
   d. when a braking regime is applied, converting at least one DSLIM in the group to a motoring mode while other DSLIMs in the group operate in generator mode and balancing the current amplitudes in upper and lower primaries of each DSLIM in the group causing that the said group of DSLIMs provides a required negative thrust force produced by a sum of upper and lower currents of all DSLIMs of the group and the said group of DSLIMs provides the required lift force produced by a difference of upper and lower currents of all DSLIMs of the group.

2. A method of controlling propulsion and suspension of one DSLIM or a plurality of DSLIMs, comprising the steps of:
  a. receiving by a controller a first input signal request for a thrust force to be generated by the DSLIM;
  b. receiving by the controller a second input signal request for a lift force to be generated by the DSLIM;
  c. when a propulsion regime is applied, producing a positive thrust force by a sum of currents in upper and lower primaries of the DSLIM while balancing current amplitudes in upper and lower primaries of the DSLIM so that their difference produces the necessary lift force for the desired positive thrust force; and
  d. when a braking regime is applied, producing a negative thrust force by sum of the currents in upper and lower primaries of the DSLIM while balancing the current amplitudes in upper and lower primaries of the DSLIM so that their difference produces the necessary lift force for the desired negative thrust force.

3. A method of controlling propulsion and suspension of linear induction motors (LIMs) of a group of two or more double-sided linear induction motors (DSLIM), two or more single-sided linear induction motors (SLIM) or two or more tubular linear induction motors (TLIM), comprising the steps of:
  a. receiving by a controller a first input signal request for a thrust force to be generated by the group of LIMs;
  b. receiving by the controller a second input signal request for a lift force to be generated by the group of LIMs;
  c. when a propulsion regime is applied, converting at least one LIM in the group to a generator mode while other LIMs in the group operate in motoring mode, causing that the said group of LIMs produces the necessary lift force for a desired positive thrust force; and
  d. when a braking regime is applied, converting at least one LIM in the group to a motoring mode while other LIMs in the group operate in generator mode, causing that the said group of LIMs produces the necessary lift force for a desired negative thrust force.

\* \* \* \* \*